United States Patent [19]
Paciorek

[11] Patent Number: 6,065,039
[45] Date of Patent: May 16, 2000

[54] DYNAMIC SYNCHRONOUS COLLABORATION FRAMEWORK FOR MOBILE AGENTS

[75] Inventor: Noemi Paciorek, Sudbury, Mass.

[73] Assignee: Mitsubishi Electric Information Technology Center America, Inc. (ITA)

[21] Appl. No.: 08/964,444

[22] Filed: Nov. 4, 1997

Related U.S. Application Data

[60] Provisional application No. 60/030,906, Nov. 14, 1996.

[51] Int. Cl.$^7$ .................................................. G06F 15/16
[52] U.S. Cl. .......................................... 709/202; 709/300
[58] Field of Search .................................... 709/201, 202, 709/213, 248, 303, 304, 300

[56] References Cited

U.S. PATENT DOCUMENTS

| | | | |
|---|---|---|---|
| 4,530,051 | 7/1985 | Johnson et al. | 709/202 |
| 5,329,626 | 7/1994 | Klein et al. | 712/30 |
| 5,499,364 | 3/1996 | Klein et al. | 709/202 |
| 5,701,484 | 12/1997 | Artsy | 709/202 |

OTHER PUBLICATIONS

Tim Finin, "Mobile Agents—UMBC AgentWeb", http://www.cs.umbc.edu/agents/mobile/.

George Lawton, "Agents to roam the Internet," SunWorld, Oct. 1996. http://www.sunworld.com/sunworldonline/swol-10-1996/swol-10-agent_p.html.

B. Lange and Yariv Aridor, "Agent Transfer Protocol—ATP/0.1", IBM Tokyo Research Laboratory, Mar. 19, 1997. http://www.trl.ibm.co.jp/aglets/atp.htm.

Weiyi Li and David G. Messerschmitt, "Java–To–Go—Intinerative computing Using Java," Sep. 10, 1996. http://ptolemy.eecs.berkeley.edu/dgm/javatools/java–to–go/.

Bill Venners, "Under The Hood: The Architecture of aglets," JavaWorld, Apr. 1997. http://www.javaworld.com/javaworld/jw–04–1997–hood_p.html.

*Primary Examiner*—Dung C. Dinh
*Attorney, Agent, or Firm*—Dirk Brinkman

[57] ABSTRACT

A dynamic synchronous collaboration framework utilizes a distributed synchronization point to permit synchronous collaboration of mobile agent objects in a distributed computer system. The framework simplifies agent collaboration for applications which divide a complex problem into multiple tasks and delegate tasks to multiple mobile agents. The collaboration framework also enables mobile agents within an application to perform synchronous collaboration with affiliated agents in the native language of an associated software application. Such collaboration is accomplished by joining collaborating agents to an agent group. Member agents periodically correlate results through a collaborative sharing within the agent group, and may adopt new behaviors based on the results of the collaboration.

37 Claims, 2 Drawing Sheets

DYNAMIC SYNCHRONOUS COLLABORATION FRAMEWORK FOR MOBILE AGENTS

CROSS-REFERENCE TO RELATED APPLICATIONS

A claim of priority is made to U.S. Provisional Patent Application Serial No. 60/030,906, filed Nov. 14, 1996, entitled USE AND COLLABORATION OF MOBILE AGENTS IN A COMPUTER NETWORK.

STATEMENT REGARDING FEDERALLY SPONSORED RESEARCH OR DEVELOPMENT

Not applicable.

BACKGROUND OF THE INVENTION

Use of software agent objects such as "intelligent agents" is known. An intelligent agent functions asynchronously and autonomously, and is programmed for artificial reasoning and learned behavior to perform assigned tasks and make decisions on behalf of an associated "owner," such as a software application.

Agents must have communications capabilities in order to perform assigned tasks. Agent communication may take the form of queries and collaborative computations including coordination of results from multiple agents to achieve a desired task. In order to collaborate, protocols must be specified for interaction between agents. One approach is to implement a user model and specify queries and assertions with a knowledge representation language, such as the Knowledge Query Manipulation Language ("KQML"), and develop ontologies or vocabularies of common terms to be utilized by interacting agents. KQML includes both a language with syntax unlike procedural or object-oriented languages and a communications protocol. An ontology is an explicit specification such as the Knowledge Interface Format ("KIF"), with syntax and semantics being extensions of a first-order predicate calculus. However, the KQML/ontology mechanism and other knowledge representation languages are not ideal for general purpose software application development. Use of such mechanisms requires aptitude in multiple languages in order to specify communications and develop complex dictionaries of terms. Further, knowledge representation languages are unlike the procedural and object-oriented languages that are typically utilized for software development. Therefore, an improved framework for supporting agent collaboration is desirable.

BRIEF SUMMARY OF THE INVENTION

In accordance with the present invention, a dynamic synchronous collaboration framework utilizes a distributed synchronization point to provide synchronous collaboration for mobile agents in a distributed system. The framework simplifies collaboration for applications which divide a complex problem into multiple tasks and delegate tasks to multiple mobile agents.

The collaboration framework enables mobile agents within an application to perform synchronous collaboration with affiliated agents in the native language of an associated software application. Such collaboration is accomplished with an agent group abstraction. In particular, collaborating agents each belong to an agent group. Member agents periodically correlate results through a collaborative sharing within the agent group, and may adopt new behaviors based on the results of the collaboration. The agent group functions as a distributed synchronization point for such synchronous collaboration. The dynamic nature of the agent group enables agents to join and leave the group as required. Hence, no prior knowledge of the member agents in the group is required and group membership may change over time.

The collaboration framework simplifies implementation of synchronous collaborating mobile agents. For example, application developers need not employ complex query representation languages, such as KQML, or develop complex ontologies. Further, an implementation of the collaboration framework in an object-oriented language such as Java enables the framework to be extended such that more complex tasks and applications may be supported. Implementation of agent groups in an object-oriented language also enables additional application-specific functionality to be added via inheritance and polymorphism.

BRIEF DESCRIPTION OF THE DRAWING

The invention will be more fully understood in view of the following Detailed Description of the Invention, and Drawing, of which.

DETAILED DESCRIPTION OF THE INVENTION

U.S. Provisional Patent Application Serial No. 60/030,906, filed Nov. 14, 1996, entitled USE AND COLLABORATION OF MOBILE AGENTS IN A COMPUTER NETWORK and U.S. application Ser. No. 08/969,478 (pending) filed on Nov. 13, 1997 are incorporated herein by reference.

Figure 1:
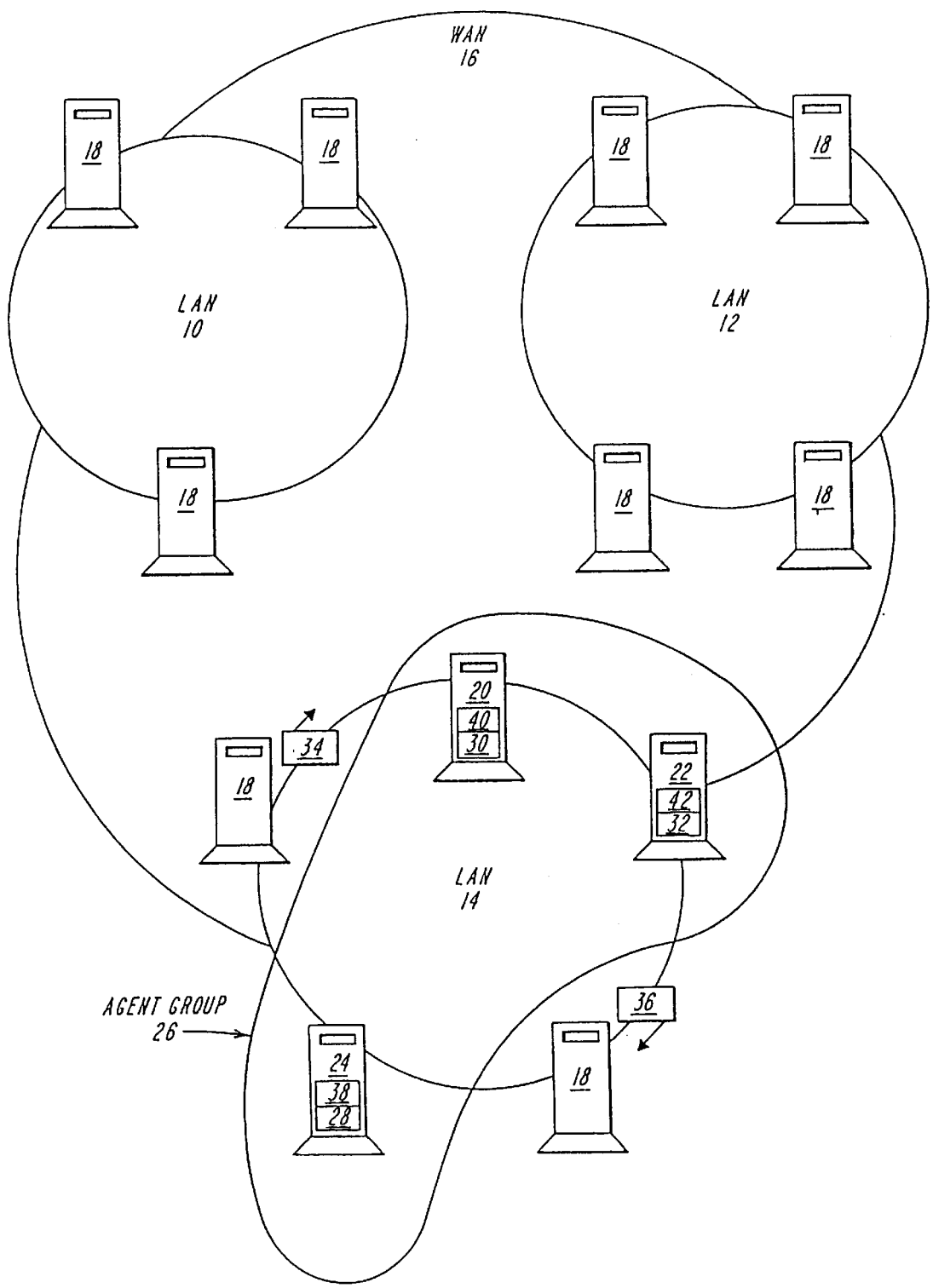
FIG. 1 is a block diagram of a dynamic synchronous collaboration framework for mobile agents in a computer network.

FIG. 1 illustrates a computer network in which three Local Area Networks ("LANs"), LAN 10, LAN 12, and LAN 14, are disposed in a Wide Area Network ("WAN") 16. Each LAN includes a plurality of nodes 18, 20, 22, 24 which are individual devices, such as computers, nodes or end stations connected to the network. An agent group 26 including a plurality of mobile agents 28, 30, 32 is also shown. The primary function of the agent group 26 is to facilitate synchronous collaboration for the mobile agents 28, 30, 32 belonging to the group. Each agent group also serves as a central point for distributing asynchronous events to agents in the group, such as notice of the termination of a particular agent. Consequently, each agent group tracks the migration of constituent agents throughout the network.

Agent collaboration will now be described by way of an example. Given a travel agency operating as node 24 in the computer network, an employee of the travel agency may wish to determine the "best" vacation package for a client, as determined by various factors such as rates, quality of accommodations and suitable travel dates. Upon entrance of the client's criteria into a local software application, the application forms a new agent group 26, generates new mobile agents 28, 30, 32, joins the new agents to the agent group, and launches the agents into the network. The agents are tasked to determine the best travel date and time, e.g., any week in February starting on a Saturday and flying before noon, and lodging which meets certain criteria, e.g., a two-bedroom condominium. The agents are also tasked to determine all expenses, such as air fare, lodging, meals, transportation, and lift tickets. Several possible travel destinations might also be specified. To accomplish these tasks each agent must query at least one data source on a destination node for specific information. Such querying could include searching another travel agency's database of promotional trips to determine if any such trips meet the criteria specified by the user.

The agent group 26 tracks the location of each member agent as that agent migrates through the network. At any point, an agent may be in one of several states, including performing computations and transmitting between nodes. The agent group may also track agent state information.

At some point during the migration each agent will co-operate to correlate query results through collaboration. For example, if each agent 28, 30, 32 migrates to local travel agency nodes, then the agents could correlate results and potentially adjust behavior based upon the results before migrating to other travel agency nodes. Collaboration may be prompted by an agent broadcasting a collaboration request message 34. Such behavior facilitates overall operation. For example, if one of the agents determines that the "Taos" ski resort has no two-bedroom condominiums available during February then all of the agents in the group will eliminate further queries about trips to the Taos ski resort.

Agent group collaboration is implemented through a distributed synchronization point and a software routine that analyzes results provided by individual agents. Each application provides a software method to analyze the results and potentially allow agent behavior modification. The synchronization point may be implemented with an object transport mechanism or by a Remote Procedure Call ("RPC") mechanism. The synchronization point may also be implemented in any procedural or object-oriented language. Object-oriented languages simplify the implementation, as the application need only subclass the agent group abstraction and provide a method to analyze the results and potentially adopt new behaviors.

Distributed synchronization requires the presence of each agent at the synchronization point: before collaboration can commence. Hence, distributed synchronization is suited to applications that divide a complex problem into a plurality of less complex tasks. As each agent arrives at the synchronization point, that agent posts results to the agent group, and then waits until all the agents in the group are present. The agent group collects the agent results as each agent arrives, and when all of the agents have arrived at the collaboration point the agent group notifies each agent in the group that collaboration may commence. The agent group then unblocks the agents and passes the collected results to each individual agent. Each agent then calls an application specific method to analyze the results and potentially adopt new behaviors.

The agent group 26 ensures that all agents in the group arrive at the synchronization point by tracing the migration of each agent through the network. As part of a Java Agent System, an agent manager on each node manages agent migration and signals each associated agent group when an agent arrives on the node and departs from the node. Should an agent fail to arrive at the synchronization point in a predetermined, configurable length of time, the agent group may hail the agent based upon predetermined criteria by sending a message 36 to ensure that the agent is still active. Hailing is performed via the agent manager on the node where the respective agent is executing where only one agent manager can be active on a given node. If the agent fails to respond to the hail message, the agent group may notify the other members of the group by distributing a "Collaboration Failed" event that indicates that a particular agent is not responding. In response, the agents may proceed with the collaboration or, alternatively, the agents may abort the collaboration based on predetermined criteria.

Agent groups store a persistent copy of the state information associated with each agent in the group to provide increased reliability. If the agent group should terminate unexpectedly, the group is restarted and updated with the respective states of the member agents as read from persistent storage. Agents may choose to communicate with an agent group proxy 38, 40, 42 instead of an agent group. The proxy shields the agents from agent group failures. The agent group restart is thus transparent to the agents.

Agent groups provide a distributed events mechanism in addition to the synchronous collaboration framework. The distributed events mechanism enables the agent group to notify members of the group of outstanding events, such as the termination of an agent, or the detection of a collaboration deadlock. Agents may build on the mechanism to forward application-generated or exceptional events to other members in the group. For example, if an agent receives an application-generated exception then the agent may notify the other agents in the group before terminating. Each agent can include an event thread to deal with these events.

The agent group may generate events and distribute those events to the group members. For example, the agent group may distribute a "Deadlock" event to the group members upon detection of a deadlock situation. The agent group implements deadlock detection by means of a time-out mechanism and potentially agent hailing. In response to the hailing message the agent returns state information via the agent manager. If the agent is already in a collaborating state but has not arrived at the synchronization point, a deadlock has occurred. In the case of deadlock, the agent group aborts the collaboration and may notify the other agents in the group of the deadlock based on predetermined criteria by broadcasting a "Deadlock" event. A deadlock is generally a result of a programming error. Consequently, the agent group does not employ more sophisticated deadlock detection or avoidance.

The agent group handles distributed events by maintaining a potentially remote reference to an event queue associated with each agent. The agent group forwards all received events to the other members of the group by enqueuing such events. The agent group may be implemented without a remote referencing capability, but this adds complexity. Each agent contains an events thread which is responsible for dequeuing the event and calling the application-specific event handler. If an agent is in transit when the agent group is forwarding events, the agent group queues the events locally. Once the agent arrives at its destination, the agent notifies the agent group via the agent manager. The agent group then flushes the events stored locally for that agent.

Agent groups implement varying levels of persistence, as defined by actual configuration. Memberships and agent states are updated infrequently, and consequently are written to persistent storage. However, local queues maintained on behalf of in-transit agents may also be saved in persistent storage, if desired. Implementation of the agent group in an object-oriented language enables applications to extend functionality, if required, by subclassing the agent group object.

Eventually each agent will perform the tasks assigned to that agent. Further, an "answer" to the original query may be arrived at through at least one collaborative sharing and a return of results to the application which launched the agents. When an agent has accomplished the assigned task and relayed the associated results, the agent is terminated and a termination event may be broadcast to the other agents in the group. When each of the agents in the group has been terminated, the agent group is also terminated.

Sharing of data between groups is also possible. Each agent may simultaneously belong to a plurality of groups. Hence, an agent may collaborate with an agent from a first group and subsequently provide data gathered during such collaboration to another agent in a second group.

Figure 2:
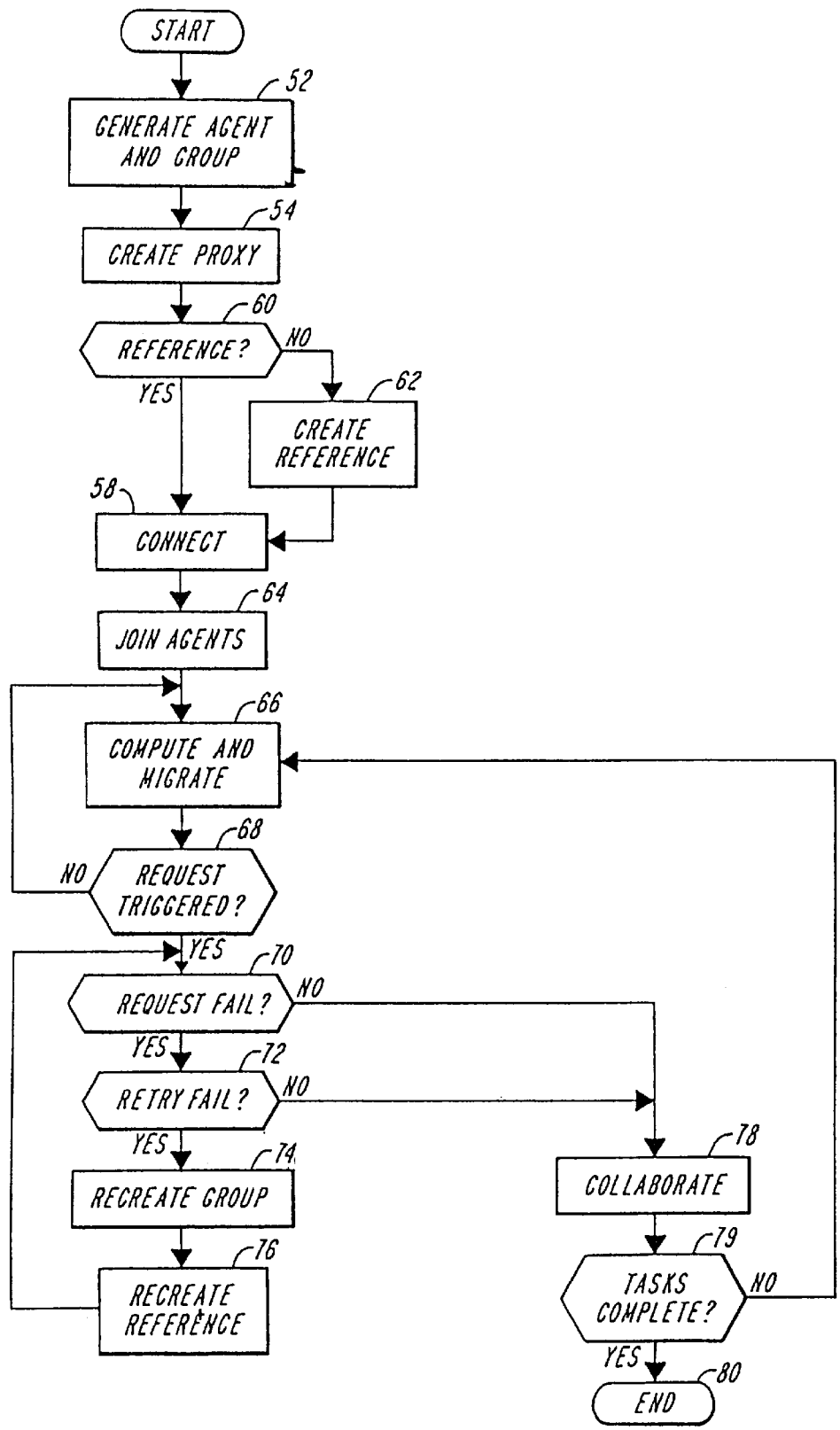
FIG. 2 is a flow diagram of collaboration framework and mobile agent operation.

FIG. 2 is a flow diagram which illustrates operation of a collaborating mobile agent which uses an agent group proxy. Initially agents and an agent group are generated by a software application as depicted in step 52. Each agent then creates an agent group proxy for each agent group to which that agent will be joined as shown in step 54. The function of the proxy is to maintain an active connection to the associated agent group and to re-establish the connection or re-create the agent group as needed in the event of agent group failure. When the agent group proxy is initialized, the group reference is sought in the name space as depicted in step 60. If searching the name space fails, the proxy creates the agent group and enters a reference to it into the name space in step 62. The agent group proxy then establishes a connection with the agent group as shown in step 58. If searching the name space in step 60 produces a group reference, a connection is established as shown in step 58.

Once a connection is established, the agent is joined to the group as shown in step 64 and then proceeds with computations and migrations at various nodes within the network as illustrated in step 66. Eventually, a collaboration request is generated in decision step 68. Collaboration is accomplished through the agent group proxy. Contact is attempted and if the agent group has failed or is in a unknown state, the proxy will be unable to contact the agent group as determined in inquiry step 70. In the event of failure, the agent group proxy first retries the communication as illustrated in step 72 and, if the proxy is still unable to communicate with the agent group, the proxy re-creates the group as depicted in step 74 and updates the name space with a reference to the new agent group as depicted in step 76. The re-creation of the agent group is serialized to prevent multiple agent group proxies from simultaneously re-creating the group. If a proxy determines that the agent group is in the process of being re-created, then the proxy waits until a reference to the new group appears in the name space. Once the agent group has been re-created, the proxy retries the request as illustrated in step 70. When the request is successful collaboration proceeds as shown in step 78. If the agent has not completed the assigned tasks as determined in inquiry step 79 then flow returns to step 66. Eventually, the agent completes the assigned tasks and is terminated as illustrated in step 80.

Having described the preferred embodiments of the invention, other embodiments which incorporate concepts of the invention will now become apparent to one of skill in the art. Therefore, the invention should not be viewed as limited to the disclosed embodiments but rather should be viewed as limited only by the spirit and scope of the appended claims.

What is claimed is:

1. In a computer network including at least a first computer node and a second computer node, a mechanism for sharing information in said network comprising:

a plurality of mobile agent objects launched by an application in the first computer node and joined to a group, each mobile agent having at least one task assigned thereto; and a distributed synchronization point at which the mobile agents collaborate by sharing data;

said mobile agent objects being operable to migrate from said first computer node to at least one other computer node within the computer network, to perform computations, and collaboratively share information derived from the computations through the distributed synchronization point.

2. The mechanism of claim 1 wherein the mobile agent objects collaborate in a language which is native to the launching application.

3. The mechanism of claim 1 wherein multiple collaborations are executed through the distributed synchronization point.

4. The mechanism of claim 1 wherein at least one mobile agent object adopts a new behavior based upon the collaboratively shared information.

5. The mechanism of claim 1 wherein such framework is implemented in an object oriented language.

6. The mechanism of claim 5 wherein such object oriented language is selected from the group consisting of Java and C++.

7. The mechanism of claim 1 wherein the distributed synchronization point is implemented with an object transport mechanism.

8. The mechanism of claim 1 wherein the distributed synchronization point is implemented with an RPC mechanism.

9. The mechanism of claim 1 wherein at least one mobile agent object includes a method which is called during collaboration for data analysis.

10. The mechanism of claim 1 wherein the group stores a persistent record indicating a current location for each mobile agent object within such group.

11. The mechanism of claim 10 wherein the group stores a persistent record indicating a current state for each mobile agent object within such group.

12. The mechanism of claim 1 wherein the group includes a function which sends a hail message for establishing contact with at least one mobile agent object.

13. The mechanism of claim 12 wherein the hail function is executed through an agent manager.

14. The mechanism of claim 13 wherein the group includes a routine for broadcasting events to mobile agent objects associated with the group.

15. The mechanism of claim 14 wherein an event indicating collaboration failure is broadcast by the group when an associated agent object fails to respond to the hail message.

16. The mechanism of claim 14 wherein an event indicating deadlock is broadcast by the group when the group determines that a mobile agent object has entered a collaboration state but has not arrived at the synchronization point.

17. The mechanism of claim 11 wherein each mobile agent object is associated with a group proxy through which such agent communicates with the group.

18. The mechanism of claim 17 wherein at least one such group proxy re-creates the group by employing the persistent records indicating current state and location for each mobile agent object within such group upon making a determination that the group has prematurely ceased operation.

19. A method for sharing information between mobile agent objects in a computer network including at least a first computer node having a software application, comprising the steps of:

generating a plurality of mobile agent objects from the software application in the first computer node;

assigning a task to each mobile agent object;

joining at least a portion of said plurality of mobile agent objects to a group;

forwarding the joined mobile agent objects from said first computer node to at least one other computer node within said network, the mobile agent objects performing computations in the at least one other computer node; and sharing information derived from the performed computations between the joined mobile agent objects by forming a distributed synchronization point at which the mobile agents share with other mobile agent objects within said group.

20. The method of claim 19 including the further step of the mobile agent objects collaborating in a language which is native to the launching application.

21. The method of claim 19 including the further step of executing multiple collaborations through the distributed synchronization point.

22. The method of claim 19 including the further step of at least one mobile agent object adopting a new behavior based upon the collaboratively shared information.

23. The method of claim 19 including the further step of implementing the framework in an object oriented language.

24. The method of claim 23 inducing the further step of implementing the framework in a language selected from the group consisting of Java and C++.

25. The method of claim 19 including the further step of implementing the distributed synchronization point with an object transport mechanism.

26. The method of claim 19 including the further step of implementing the distributed synchronization point with an RPC mechanism.

27. The method of claim 19 including the further step of calling a method by at least one mobile agent object during collaboration for data analysis.

28. The method of claim 19 including the further step of storing a persistent record indicating a current location for each mobile agent object within such group.

29. The method of claim 28 including the further step of storing a persistent record indicating a current state for each mobile agent object within such group.

30. The method of claim 19 including the further step of the group sending a hail message for establishing contact with at least one mobile agent object.

31. The method of claim 30 including the further step of executing the hail function through an agent manager.

32. The method of claim 31 including the further step of broadcasting events to mobile agent objects associated with the group.

33. The method of claim 32 including the further step of broadcasting an event indicating collaboration failure when an agent object associated with the group fails to respond to the hail message.

34. The method of claim 33 including the further step of broadcasting an event indicating deadlock when the group determines that a mobile agent object has entered a collaboration state but has not arrived at the synchronization point.

35. The method of claim 29 including associating each mobile agent object with a group proxy through which such agent communicates with the group.

36. The method of claim 35 including the further step of a group proxy re-creating the group by employing the persistent records indicating current state and location for each mobile agent object within such group upon making a determination that the group has prematurely ceased operation.

37. A method for sharing information in a computer network of nodes, each node having an associated destination, comprising the steps of:

migrating a plurality of agents among the nodes according to destination associated with each agent;

executing each agent in a corresponding destination node when the agent arrives at the destination node to produce the information;

identifying one of the nodes as a synchronization point node; and migrating the agents to the synchronization point node in response to a request to collaborate message received by the agents;

passing the information among the agents when the agents arrive at the synchronization point node.

* * * * *